(12) United States Patent
Beavers et al.

(10) Patent No.: US 9,921,721 B2
(45) Date of Patent: Mar. 20, 2018

(54) NAVIGATION INTERFACES FOR EBOOKS

(71) Applicant: Google Inc., Mountain View, CA (US)

(72) Inventors: Adeline Beavers, Mountain View, CA (US); Chorong Johnston, Mountain View, CA (US); Marco Paglia, San Francisco, CA (US); Brian Armstrong, San Francisco, CA (US); Nathan Stuart Streu, San Francisco, CA (US)

(73) Assignee: Google LLC, Mountain View, CA (US)

( * ) Notice: Subject to any disclaimer, the term of this patent is extended or adjusted under 35 U.S.C. 154(b) by 349 days.

(21) Appl. No.: 14/455,077

(22) Filed: Aug. 8, 2014

(65) Prior Publication Data

US 2016/0041700 A1    Feb. 11, 2016

(51) Int. Cl.
| | | |
|---|---|---|
| *G06F 3/048* | (2013.01) | |
| *G06F 3/0483* | (2013.01) | |
| *G06F 3/0488* | (2013.01) | |
| *G06F 3/0481* | (2013.01) | |

(52) U.S. Cl.
CPC ........ *G06F 3/0483* (2013.01); *G06F 3/04817* (2013.01); *G06F 3/04883* (2013.01)

(58) Field of Classification Search
CPC . G06F 3/0483; G06F 3/04817; G06F 3/04883
See application file for complete search history.

(56) References Cited

U.S. PATENT DOCUMENTS

| | | | |
|---|---|---|---|
| 7,689,933 B1 * | 3/2010 | Parsons ................. | G06F 3/0482 715/200 |
| 7,979,785 B1 | 7/2011 | Wang et al. | |
| 2008/0062141 A1 * | 3/2008 | Chandhri .............. | G06F 3/0482 345/173 |
| 2010/0283743 A1 * | 11/2010 | Coddington .......... | G06F 3/0485 345/173 |

(Continued)

FOREIGN PATENT DOCUMENTS

KR    10-2013-0131820 A    12/2013

OTHER PUBLICATIONS

Pappas P., "How-To Tips for Working With iBooks Author", Ed. Tech., Oct. 10, 2012, 32 pages, [online], [retrieved Feb. 23, 2015], Retrieved from the Internet, < http://www.peterpappas.com/2012/10/how-to-tips-for-working-with-ibooks-author.html>.

(Continued)

*Primary Examiner* — Andrew T Chiusano
(74) *Attorney, Agent, or Firm* — Shumaker & Sieffert, P.A.

(57) ABSTRACT

An ebook is represented as a plurality of ebook pages associated with a plurality of segments. A navigation command is received from a user, the navigation command requesting a navigation graphical user interface (GUI) in a particular navigation mode of a plurality of navigation modes. One or more ebook pages, of the plurality of ebook pages, are identified for page thumbnail generation, and page thumbnails are generated for each of the identified one or more ebook pages. The generated page thumbnails are (Continued)

grouped by segment, using the plurality of segments. The navigation GUI is generated in the requested navigation mode using the grouped page thumbnails, the navigation GUI listing at least one segment, of the plurality of segments, and horizontally listing at least one page thumbnail associated with the at least one segment, and the navigation GUI is displayed.

19 Claims, 7 Drawing Sheets

(56) References Cited

U.S. PATENT DOCUMENTS

| | | | | |
|---|---|---|---|---|
| 2011/0307836 | A1* | 12/2011 | Cho | G06F 17/30058 715/838 |
| 2012/0131464 | A1* | 5/2012 | Penner | G06F 17/24 715/732 |
| 2012/0185456 | A1* | 7/2012 | Hart | G06F 3/04817 707/706 |
| 2012/0229391 | A1 | 9/2012 | Skinner et al. | |
| 2013/0055077 | A1* | 2/2013 | Hagel-Sorensen | G06F 17/212 715/273 |
| 2013/0073932 | A1* | 3/2013 | Migos | G06F 15/0291 715/201 |
| 2013/0205244 | A1* | 8/2013 | Decker | G06F 17/21 715/777 |
| 2013/0290886 | A1* | 10/2013 | Chen | G06F 3/0482 715/768 |
| 2014/0109012 | A1* | 4/2014 | Choudhary | G06F 3/0483 715/838 |
| 2015/0177933 | A1* | 6/2015 | Cueto | G06F 3/0483 715/776 |
| 2016/0034430 | A1* | 2/2016 | Beavers | G06F 3/0483 715/205 |
| 2016/0048275 | A1* | 2/2016 | Beavers | G06F 3/0483 715/202 |

OTHER PUBLICATIONS

International Search Report and Written Opinion of International Application No. PCT/US2015/036964, dated Sep. 9, 2015, 10 pp.
Matulic, "Automatic Selection of Visually Attractive Pages for Thumbnail Display in Document List View", Nov. 13-16, 2008 Third International Conference on Digital Information Management, 6 pps.

* cited by examiner

NAVIGATION INTERFACES FOR EBOOKS

BACKGROUND

Field of Disclosure

This disclosure relates to the field of displaying information via a graphical user interface, and specifically to generating navigation interfaces that facilitate navigation of ebooks.

Description of the Related Art

Many users utilize their digital devices to read digital content such as novels, news articles, short stories, etc., view videos, view pictures, or more generally interact with some sort of displayed content. Ebooks currently are navigated in a linear, page by page, fashion. While linear navigation works well for reading some types of books (e.g., novels), it is not optimal for the types of books which readers generally read in a non-linear manner (e.g., read only at pages of interest), such books may include, e.g., cookbooks, travel books, textbooks, etc.

SUMMARY

The above and other needs are met by a computer-implemented method, a non-transitory computer-readable storage medium storing executable code, and a system for generating navigation interfaces that facilitate navigation of ebooks.

One embodiment of the computer-implemented method for generating navigation interfaces that facilitate navigation of ebooks, comprises representing an ebook as a plurality of ebook pages associated with a plurality of segments. A navigation command is received from a user, the navigation command requesting a navigation graphical user interface (GUI) in a particular navigation mode of a plurality of navigation modes. One or more ebook pages, of the plurality of ebook pages, are identified for page thumbnail generation. Page thumbnails are generated for each of the identified one or more ebook pages, wherein the page thumbnail is associated with the same segment as the associated ebook page. The generated page thumbnails are grouped by segment, using the plurality of segments. The navigation GUI is generated in the requested navigation mode using the grouped page thumbnails, the navigation GUI listing at least one segment, of the plurality of segments, and horizontally listing at least one page thumbnail associated with the at least one segment, and the navigation GUI is displayed.

One embodiment of a non-transitory computer-readable storage medium storing executable computer program instructions for generating navigation interfaces that facilitate navigation of ebooks, comprises representing an ebook as a plurality of ebook pages associated with a plurality of segments. A navigation command is received from a user, the navigation command requesting a navigation graphical user interface (GUI) in a particular navigation mode of a plurality of navigation modes. One or more ebook pages, of the plurality of ebook pages, are identified for page thumbnail generation. Page thumbnails are generated for each of the identified one or more ebook pages, wherein the page thumbnail is associated with the same segment as the associated ebook page. The generated page thumbnails are grouped by segment, using the plurality of segments. The navigation GUI is generated in the requested navigation mode using the grouped page thumbnails, the navigation GUI listing at least one segment, of the plurality of segments, and horizontally listing at least one page thumbnail associated with the at least one segment, and the navigation GUI is displayed.

One embodiment of a device for generating navigation interfaces that facilitate navigation of ebooks, comprises a processor configured to execute modules, and a memory storing the modules. The modules include a parsing module configured to represent an ebook as a plurality of ebook pages associated with a plurality of segments, and a command detection module configured to receive a navigation command from a user, the navigation command requesting a navigation graphical user interface (GUI) in a particular navigation mode of a plurality of navigation modes. The modules also include a thumbnail generation module configured to identify one or more ebook pages, of the plurality of ebook pages, for page thumbnail generation, and generate page thumbnails for each of the identified one or more ebook pages, wherein the page thumbnail is associated with the same segment as the associated ebook page. The modules also include a grouping module configured to group the generated page thumbnails by segment, using the plurality of segments. The modules also include a navigation interface module configured to generate the navigation GUI in the requested navigation mode using the grouped page thumbnails, the navigation GUI listing at least one segment, of the plurality of segments, and horizontally listing at least one page thumbnail associated with the at least one segment, and display the navigation GUI.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
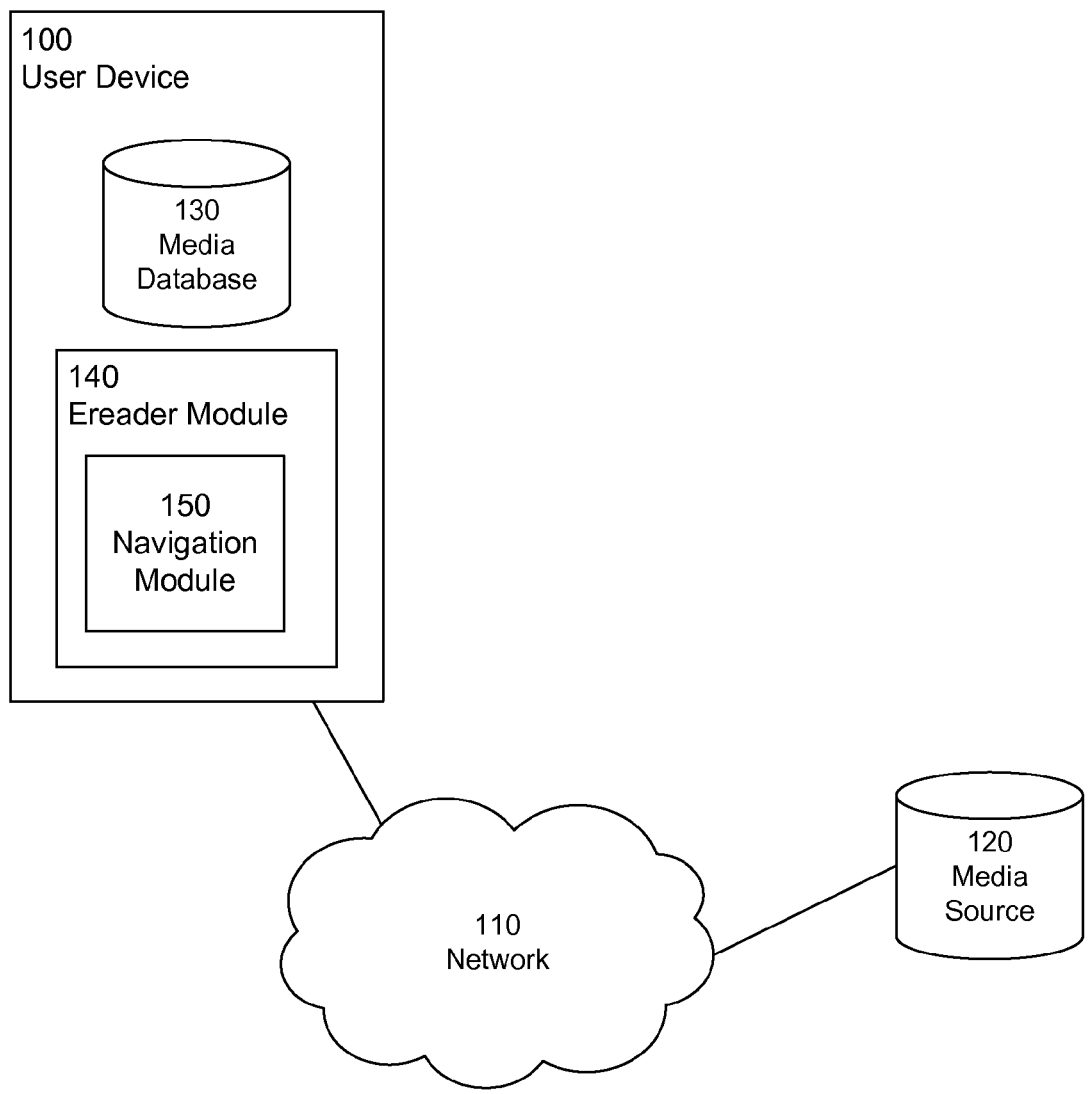
FIG. 1 is a high-level block diagram illustrating an embodiment of an environment for generating navigation interfaces that facilitate navigation of ebooks.

FIG. 1 is a high-level block diagram illustrating an embodiment of an environment for generating navigation interfaces that facilitate navigation of ebooks. The environment includes a user device 100 connected by a network 110 to a media source 120. Here only one user device 100 and media source 120 are illustrated but there may be multiple instances of each of these entities. For example, there may be thousands or millions of user devices 100 in communication with multiple media sources 120.

The network 110 provides a communication infrastructure between the user devices 100 and the media sources 120. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network.

The user devices 100 are computing devices that execute computer program modules—e.g., a web browser or other client application—which allow a user to view ebooks, newsfeeds, browse the Internet, and generally consume media content. A user device 100 might be, for example, a personal computer, a tablet computer, a smart phone, a laptop computer, a dedicated e-reader, or other type of network-capable device such as a networked television or set-top box.

The media source 120 includes one or more computer servers that provide ebooks to the user devices 100. The media source 120 may be, for example, an ebook retailer, a library, etc. The media source 120 may directly provide an ebook to the user devices 100 via the network 110.

An ebook is an electronic book that includes content and metadata. The ebook content includes an electronic collection of text (and possibly additional types of content such as images and/or sound). For example, the ebook content includes the content of a book such as would be printed on the pages of a traditional paper-based book. All of the text in the collection may be from a single source, or the collection may contain text from different sources. The text may have originated in a traditional paper-based format (e.g., a physical book or newspaper), or it may have originated in a digital format (e.g., electronic files in a format such as Portable Document Format (PDF), EPUB format, or flowing text format). The content of an ebook is divided into segments. A segment is a section of an ebook that is associated with a portion of the content of related pages in an ebook. A segment may be, for example, a chapter, a subsection of a chapter, an index, a map, a recipe, a bibliography, some other portion of the ebook, or some combination thereof. For example, an ebook can include one segment for each chapter of the ebook, a segment for the index, etc.

The ebook metadata includes bibliographical information about the ebook, such as the ebook identifier, title, author, publication date, edition/version number, number of pages, number of chapters, page thumbnails for pages of the ebook, or some combination thereof. The ebook metadata also includes a list of segments into which the ebook's content is divided. A segment is represented in the list by a segment ID that uniquely identifies the segment within the ebook (e.g., a chapter number).

A user device 100 comprises a media database 130 and an ereader module 140 in one embodiment. In one embodiment these entities are software application modules executing on the user device 100. For example, the modules 130 and 140 may be integrated into a smart phone application executing on a smart phone.

The media database 130 stores information relating to ebooks. Information relating to ebooks includes ebooks, associated metadata, and annotations. Annotations may be, e.g., bookmarks, comments, highlighted portions, etc.

The ereader module 140 includes a navigation module 150 that processes navigation commands received from the user. A navigation command is command that facilitates user navigation of an ebook. A navigation command may, e.g., allow a user to page forward and/or backward with the ebook, generate a navigation interface in a particular navigation mode, allow the user to interact with the generated navigation interface (e.g., as described below with reference to FIGS. 2B and 2C), allow the user to perform some other action, or some combination thereof.

In some embodiments, responsive to receiving a navigation command from the user (e.g., via a gesture), the navigation module 150 generates a navigation interface. A navigation interface is a graphical user interface (GUI) that enables a user to navigate to different pages in an ebook in a quick and/or non-linear fashion. The navigation interface operates in, for example, two navigation modes, an intermediate navigation mode or a table of contents (TOC) mode. A navigation command may cause the navigation module 150 to generate a navigation interface in a particular navigation mode and/or cause an existing navigation interface to change navigation mode. Examples of navigation interfaces in different navigation modes are discussed in detail below with respect to FIGS. 2B and 2C.

After a navigation command requesting a navigation interface of a particular mode is received, the navigation module 150 identifies ebook pages for thumbnail generation, and generates page thumbnails for the identified ebook pages. A page thumbnail is a selectable image of an ebook page which has been scaled down in size, and if selected causes the ereader module 140 to display the ebook page associated with the page thumbnail. The navigation module 150 identifies segments associated with the generated page thumbnails, and groups the page thumbnails by segment. The navigation module 150 generates the requested navigation interface in the particular navigation mode using the grouped page thumbnails.

The navigation module 150 then presents the generated navigation interface in the particular navigation mode to the user. As discussed in detail below with respect to FIG. 2B, the navigation interface in the intermediate navigation mode lists at least one page thumbnail corresponding to an ebook page and a portion of a second page thumbnail that corresponds to a second ebook page that is adjacent to the ebook page. In the intermediate navigation mode, a user is able to rapidly page forward/backward through the displayed page thumbnails using, e.g., certain gestures (e.g., horizontal swipe), a smart scrubber as described below with reference to FIG. 2B, or both. The speed of a horizontal swipe may correlate with the number of page thumbnails paged forward/backward. Thus, the navigation interface in the intermediate navigation mode allows a user to rapidly navigate through the pages of an ebook by rapidly paging forward and/or backward through the ebook. The intermediate navigation mode may be considered a partially zoomed out view of the ebook, and may be useful when a user is looking for content near their current reading location. Additionally, while in the intermediate navigation mode, a user may cause the navigation module 150 to change the navigation mode to a TOC mode (e.g., enter a fully zoomed our view of the ebook) and/or present a particular ebook page (e.g., zooming back into an ebook page) based on one or more navigation commands.

As discussed in detail below with respect to FIG. 2C, a navigation interface in a TOC mode lists the identified segments in the ebook vertically, and lists the page thumbnails grouped with that segment horizontally below a segment title (e.g., chapter title). A user is able to vertically scroll through segments, and horizontally scroll through individual page thumbnails within each listed segment. Thus, the table of contents mode allows a user to easily navigate through the pages of an ebook by selecting not only a segment of interest to the user, but an exact ebook page within the segment via an associated page thumbnail.

In some embodiments, the page thumbnail associated with the ebook page that was being displayed by the user device 100 when the navigation command was received is emphasized (e.g., the page thumbnail may be slightly larger than other page thumbnails) in the navigation interface. The emphasis of the page thumbnail (which likely corresponds to the user's current reading location) allows the user to scroll through various segments and/or page thumbnails in the navigation interface, but easily identify the emphasized page thumbnail and, accordingly, return to the associated ebook page.

These navigation interfaces allow a user to easily and rapidly navigate to precise locations within an ebook. For example, a user may effectively zoom out into an intermediate navigation mode to quickly find information in the current chapter and/or nearby chapters, and zoom out further into a TOC mode that lists segments of the ebook and page thumbnails associated with the listed segments. Moreover, the navigation interfaces allow a user to navigate to locations within the ebook in a non-linear manner, which may be helpful for users reading ebooks (e.g., cookbooks, travel books, text books, etc.) that are not normally read in a linear manner. Moreover, the page thumbnail corresponding to the user's current reading location may be emphasized in the TOC navigation mode and/or the intermediate navigation mode, so that the user is able to easily scroll through various chapters and/or page thumbnails without losing their place in the ebook.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the media source 120 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the media source 120 or some other content server.

Turning now to a discussion of the various GUIs of the user device 100 discussed above, FIG. 2A illustrates an example of a GUI 200 displayed by a user device 100 showing an ebook page 202 according to an embodiment.

In this embodiment, a user may navigate through the ebook using gestures. Gestures are movements made by the user while contacting a touch-screen interface of the user device 100 that impart commands (e.g., a navigation command) to the user device 100. Gestures may include, for example, a swiping gesture, a tapping gesture, a pinching gesture, some other gesture, or some combination thereof. In some embodiments, a navigation command may also be provided to the user device 100 via selectable thumbnails, selection of a menu dropdown, selection of a button on the user device 100, some other selection means, or some combination thereof.

A swiping gesture is received when a portion of the touch-screen interface is touched and the touched portion is then dragged in a particular direction. A user may page backward in the ebook by swiping horizontally from left to right across the ebook page 202. Likewise, a user may page forward in the ebook by swiping horizontally from right to left across the ebook page 202. Additionally, in some embodiments a swipe may be vertical. For example, as discussed below, a vertical swipe may be used to vertically scroll through various segments presented in FIG. 2C.

A tapping gesture is received when a single location on the touch-screen interface is touched for a short duration of time (e.g., less than half a second). A tapping gesture 204 received by the GUI 200 is used to indicate a request for a navigation interface in the intermediate navigation mode. In alternate embodiments, the tapping gesture 204 received by the GUI 200 is used to indicate a request for a navigation interface in the TOC mode.

A pinching gesture is received when two locations on the touch-screen interface are touched and a distance between the two locations then changes. A reference distance value is a value associated with an original distance between two locations originally touched on a touch-screen interface. An active distance value is a value associated with the current distance between two touched locations. For example, when a user first touches the touch-screen interface at two locations, the reference distance value is the same as the active distance value, however, as the user brings the touched locations closer together (i.e., a user is pinching inward) the active distance value also shrinks and is less than the reference distance value. Likewise, as the user moves the touched locations farther apart from each other (i.e., a user is pinching outward) the active distance value also becomes larger, and may become greater than the reference distance value.

Figure 2A:
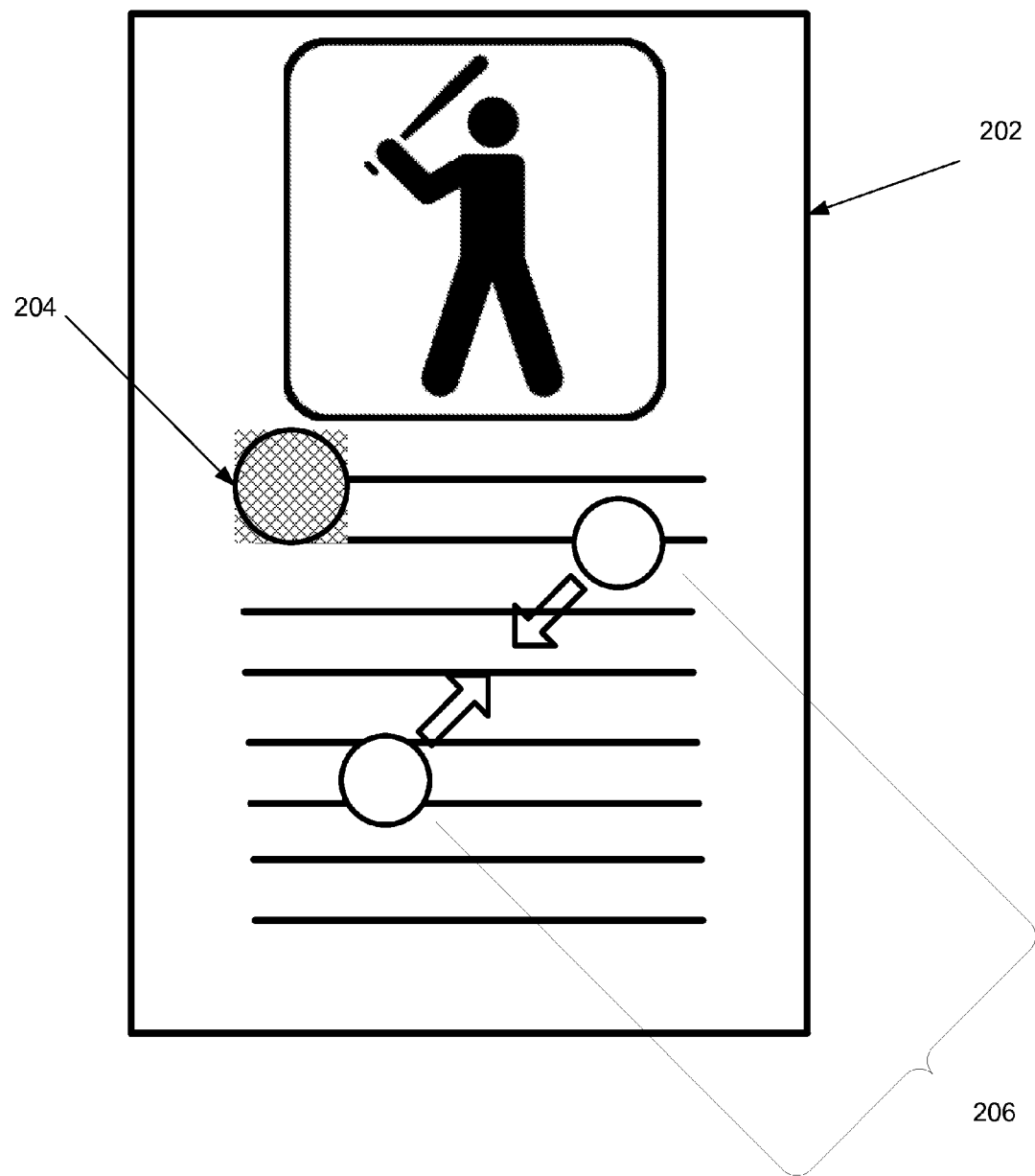
FIG. 2A illustrates an example of a graphical user interface displayed by a user device showing an ebook page according to an embodiment.

In FIG. 2A, the pinching gesture 206 is an inward pinching gesture where a user is pinching inward such that the distance between the two locations on the ebook page 202 is shrinking. In some embodiments, once the active distance value is less than a first threshold value (e.g., 75% of the reference distance value), the GUI 200 interprets the pinching gesture 206 as requesting a navigation interface in an intermediate navigation mode as shown in, e.g., FIG. 2B. If the user continues, to bring the touched locations together and the active distance value becomes less than a second threshold value (e.g., 50% of the reference distance value), the GUI 200 interprets the pinching gesture 206 as requesting a navigation interface in a TOC mode as shown in, e.g., FIG. 2C.

Figure 2B:
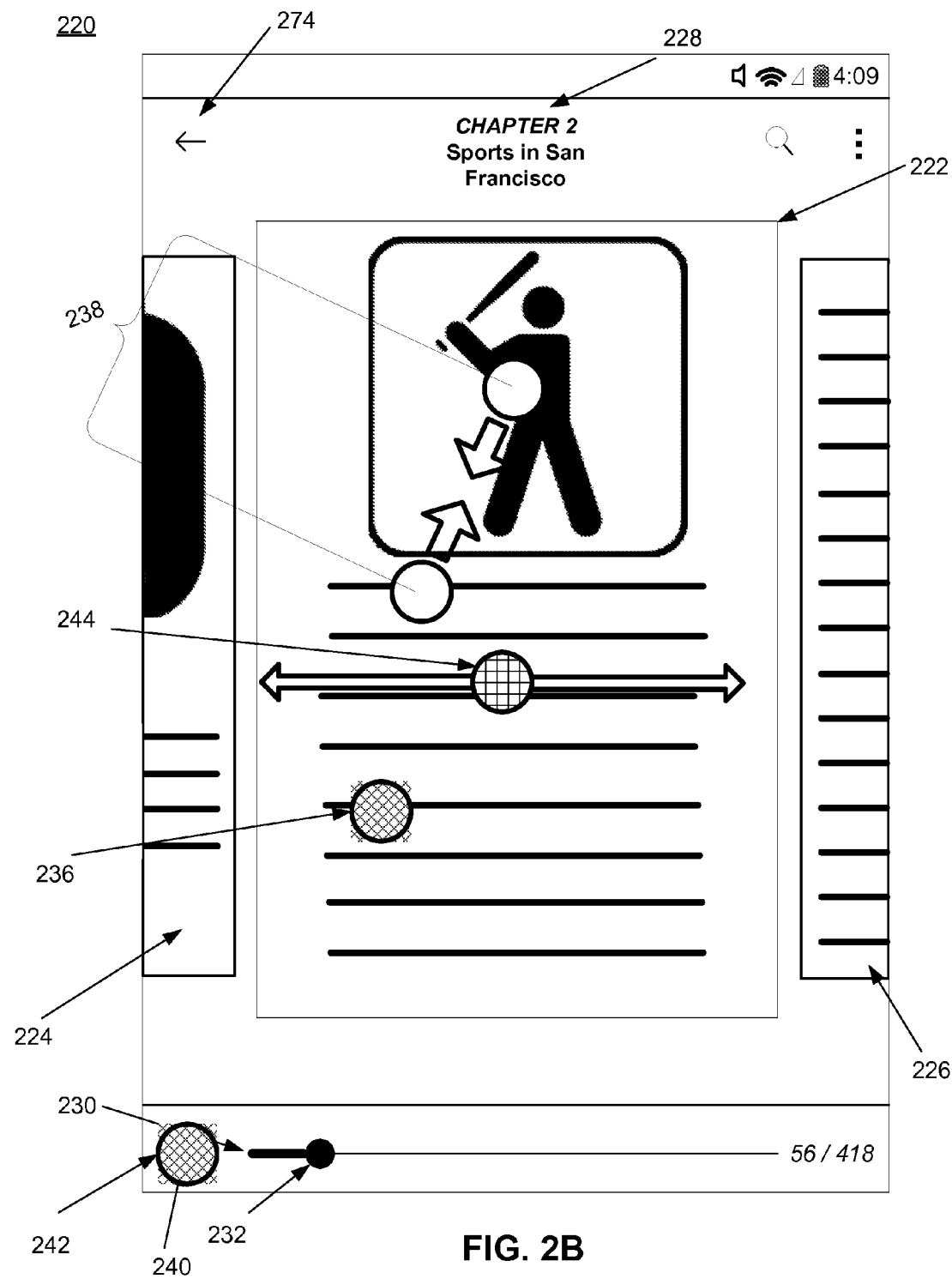
FIG. 2B illustrates an example of a graphical user interface showing a navigation interface in an intermediate navigation mode according to an embodiment.

In some embodiments, as the active distance value decreases the size of the displayed ebook page 202 also decreases, and once the active distance value is less than a first threshold value the GUI 200 seamlessly transitions (e.g., zooms out) to a navigation interface in the intermediate display mode, as shown in FIG. 2B.

FIG. 2B illustrates an example of a GUI 220 showing a navigation interface in intermediate navigation mode according to an embodiment. The GUI 220 displays page thumbnails 222, 224, and 226. A page thumbnail is a smaller version of an ebook page associated with the page thumbnail. For example, the page thumbnail 222 is a smaller version of the ebook page 202 discussed previously with regard to FIG. 2A. In some embodiments, the scaling is such that the page thumbnail is an exact reproduction of the ebook page, such that the content presented by a page thumbnail is the same content that is presented by its corresponding ebook page.

In this example, page thumbnail 222 corresponds to the ebook page 202 discussed above with reference to FIG. 2A, the page thumbnail 224 corresponds to the prior page of the ebook, and the page thumbnail 226 corresponds to the next page of the ebook. In this embodiment, the page thumbnail 222 is emphasized (e.g., made larger) with respect to other displayed page thumbnails to help identify to the user page thumbnail 222 as being associated with the ebook page that was displayed by the user device 100 immediately prior to entering the intermediate navigation mode (e.g., the ebook page 202). Additionally, the GUI 220 includes a segment area 228 that displays segment information associated with the displayed page thumbnail (e.g., page thumbnail 222 is associated with Chapter 2).

The GUI 220 includes a smart scrubber 230 that allows a user to quickly navigate the ebook. The smart scrubber 230 includes a location indicator 232 that is associated with the page thumbnail associated with the ebook page being displayed immediately prior to entering the intermediate navigation mode. For example, in this case, the location indicator 232 is associated with the page thumbnail 222. A user selects a location along the smart scrubber 230 to navigate to a page thumbnail corresponding to the selected location. Additionally, the GUI 220 includes a return thumbnail 274 that, if selected, causes the user device 100 to display what was being displayed by the user device 100 before the GUI 220 was presented by the user device 100. In this example, if a user were to select the return thumbnail 274, the client device 100 would present the ebook page 202 as shown in FIG. 2A.

The GUI 220 may receive one or more navigation commands via gestures. For example, a user may rapidly page forward or backward in the ebook using a swiping gesture 244. Swiping horizontally from right to left across the ebook page 202 causes the GUI 220 to page forward in the ebook. Likewise, a user may page backward in the ebook by swiping horizontally from left to right across the ebook page 202. In some embodiments, the GUI 220 correlates the speed of the swipe with how fast the ebook is paged.

In some embodiments, a tapping gesture on a page thumbnail is used to indicate a request to display the ebook page associated with the page thumbnail. For example, a tapping gesture 236 on the page thumbnail 222 causes the user device 100 to display the ebook page 202, as shown in FIG. 2A. Additionally, a pinching gesture on the GUI 220 and/or a selection of a table of contents (TOC) thumbnail 240 may be used to indicate a request for a navigation interface in the TOC mode. For example, a pinching gesture 238 on the GUI 220 and/or a tapping 242 of the TOC thumbnail 240 causes the user device 100 to generate and present a navigation interface in a TOC mode as shown in, e.g., FIG. 2C.

In some embodiments, changes in the active distance value associated with a pinching gesture may also cause the size of the displayed page thumbnails to change. For example, a user may increase the size of the displayed page thumbnails by increasing an active distance value such that it is larger than a reference distance value (i.e., user pinches outward). Additionally, in some embodiments, if the user continues, to increase the active distance value and the active distance value becomes larger than an expansion threshold value (e.g., 30% greater than the reference distance), the GUI 220 interprets the pinching gesture 238 as requesting the ebook page 202 be presented as shown in, e.g., FIG. 2A. Thus, a user may effectively zoom into a particular ebook page by pinching outward.

In some embodiments, a user may decrease the size of the displayed page thumbnails by decreasing the active distance value such that is smaller than the reference distance value (i.e., a user pinches inward). If the user continues to bring the touched locations together and the active distance value becomes less than a reduction threshold value (e.g., 50% of the reference distance), the GUI 220 interprets the pinching gesture 238 as requesting a navigation interface in a TOC mode as shown in, e.g., FIG. 2C. Thus, a user may effectively zoom out of the intermediate navigation mode into the TOC mode by pinching inward.

Figure 2C:
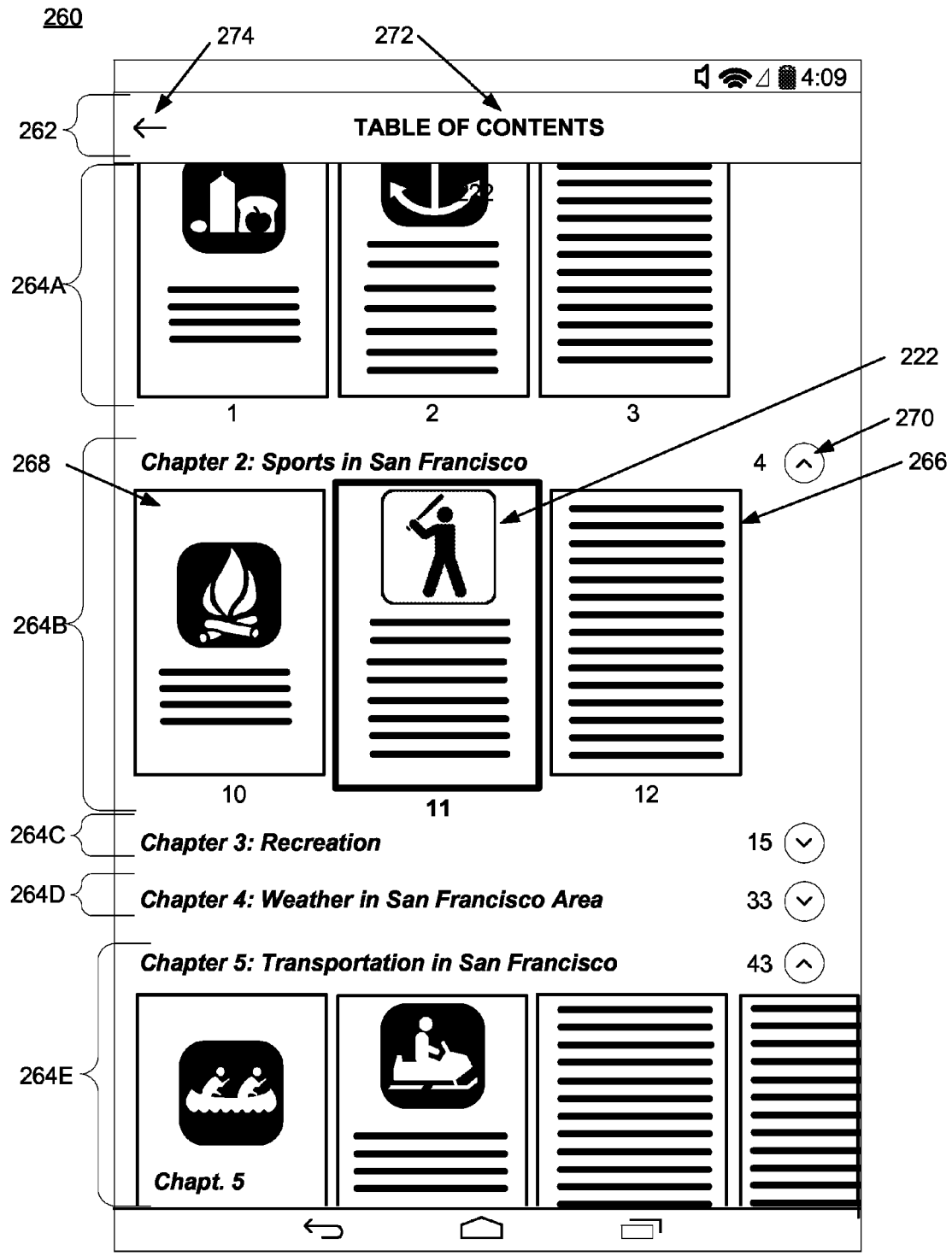
FIG. 2C illustrates an example of a graphical user interface showing a navigation interface in a table of contents mode according to an embodiment.

FIG. 2C illustrates an example of a GUI 260 showing a navigation interface in a TOC mode according to an embodiment. The GUI 260 includes a title bar 262 and a plurality of segments 264A-E. The title bar 262 identifies the navigation interface as being in the TOC mode 272. The title bar 262 also includes the return thumbnail 274.

The segments 264A-E are each associated with one or more page thumbnails, however, only segments 264A, 264B, and 264E are displaying their associated page thumbnails. For example, Chapter 2 of the ebook only has three pages, and accordingly only shows three page thumbnails 222, 266, and 268, each of which are smaller versions of a corresponding ebook page.

The GUI 260 arranges the displayed segments 264A-E in the ebook vertically. In this embodiment, a user may scroll vertically (i.e., downward and/or upward) through the segments 264A-E using gestures (e.g., vertically swiping downward or upward respectively), such that page thumbnails and/or segments originally outside a display area of the user device 100 are scrolled into the display area.

The segments include a horizontal listing of page thumbnails for each of the segment's associated ebook pages. For example, segments 264A, 264B, and 264E are toggled such that their associated page thumbnails are visible. The user may scroll horizontally through each of the displayed page thumbnails within a segment such that page thumbnails originally outside a display area of the user device 100 are scrolled into the display area. Additionally, the GUI 260 emphasizes the page thumbnail associated with the ebook page that was being presented to the user when the navigation command was received. For example, page thumbnail 222 is slightly larger than other page thumbnails being presented to indicate the ebook page that was being presented to the user when the navigation command was received. Emphasizing the page thumbnail 222 allows a user to navigate the various segments and associated page thumbnails, and easily find and/or return to their previous reading location (e.g., ebook page 202).

The page thumbnails are selectable, and if selected, e.g., via a user tapping on a page thumbnail, the GUI 260 displays the ebook page corresponding to the selected page thumbnail. Thus, a user is easily able to discern an exact location within a segment using the page thumbnails within the segment, and navigate directly to the associated ebook page by selecting the corresponding page thumbnail. In some embodiments, the GUI 260 may display or cease displaying page thumbnails associated with a segment 264 based on user input. For example, the GUI 264 includes a toggle button 270 that if selected causes the GUI 260 to cease display of a page thumbnails within a segment.

Figure 3:
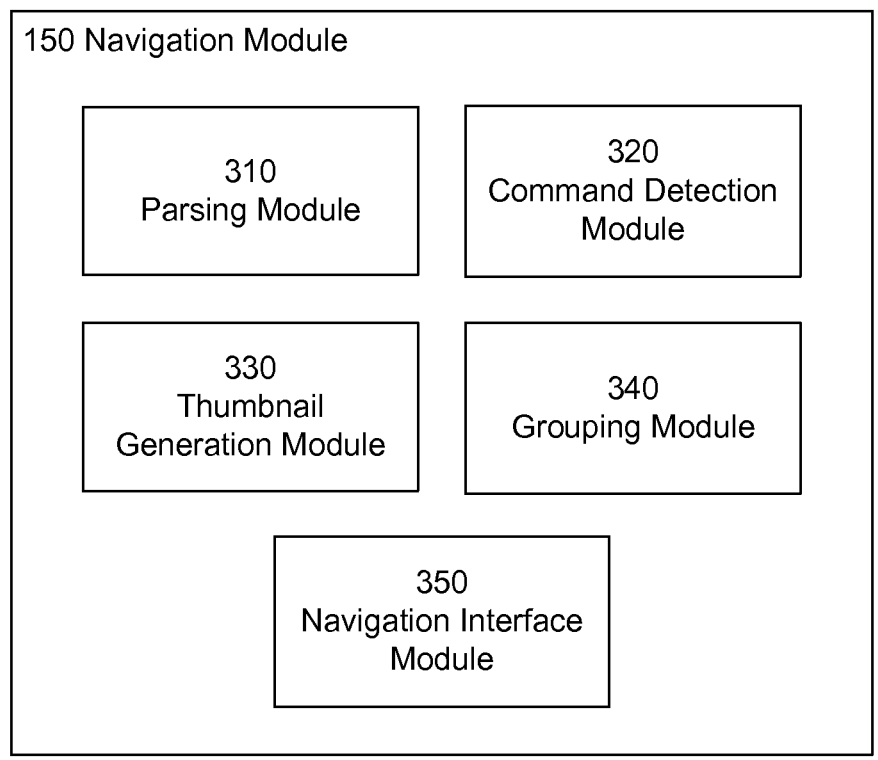
FIG. 3 is a high-level block diagram illustrating a detailed view of modules within a navigation module of a user device according to an embodiment.

Turning now to a discussion of the structure of the navigation module 150, FIG. 3 is a high-level block diagram illustrating a detailed view of modules within the navigation module 150 of a user device 100 according to one embodiment. Some embodiments of the navigation module 150 have different modules than those described here. Similarly, the functions can be distributed among the modules in a different manner than is described here. The navigation module 150 is comprised of modules including a parsing module 310, a command detection module 320, a thumbnail generation module 330, a grouping module 340, and a navigation interface module 350.

The parsing module 310 represents an ebook as a plurality of ebook pages associated with a plurality of segments. The parsing module 310 parses the ebook into ebook pages. The amount of ebook content in an ebook page may vary based in part on the area of the display available to present ebook content, the font size, and/or other factors. The parsing module 310 uses these factors to parse the ebook into ebook pages. FIG. 2A discussed above shows a single ebook page provided by the parsing module 310. The parsing module 310 provides one or more of such ebook pages to the ereader module 140 for presentation to the user.

The command detection module 320 detects navigation commands that are provided to the user device 100. As discussed above, with respect to FIGS. 2A and 2B, navigation commands may be received via, e.g., gestures on a touch-screen interface, selection of menu items, buttons on the user device 100, etc. The command detection module 320 analyzes the detected navigation command to determine whether a navigation interface is being requested, and if so, which navigation mode is being requested. For example, a tapping gesture on a displayed ebook page may indicate a request for an intermediate navigation mode. Additionally as discussed above with respect to FIG. 2A, a pinching gesture on a displayed ebook page may indicate a request for a navigation interface in an intermediate navigation mode or a TOC mode, based on a comparison of an active distance value to particular threshold values. For example, as the user pinches inward and the active distance value becomes less than a first threshold value (e.g., 75% of the reference distance value), the command detection module 320 interprets the pinching gesture as a request for a navigation interface in an intermediate navigation mode. Additionally, if the user continues, to bring the touched locations together and the active distance value becomes less than a second threshold value (e.g., 50% of the reference distance value), the command detection module 320 interprets the pinching gesture as requesting a navigation interface in TOC mode. The command detection module 320 provides the type of navigation mode requested to the thumbnail generation module 330 and/or other modules.

The thumbnail generation module 330 generates page thumbnails in accordance with the requested type of navigation mode. Generation of a page thumbnail refers to creation of a page thumbnail from an ebook page and/or retrieving a page thumbnail from the media database 130 and/or the media source 120.

The thumbnail generation module 330 generates page thumbnails for some or all of the ebook pages. In some embodiments, the thumbnail generation module 330 creates page thumbnails for all of the ebook pages when the ebook is first downloaded from the media source 120, a change in screen size is detected, a change in font is detected, a change in typeface is detected, annotations are added, change in the parsed ebook pages, or some combination thereof. Alternatively, the thumbnail generation module 330 receives the page thumbnails from the media source 120. The thumbnail generation module 330 stores the created and/or received page thumbnails in the media database 130. In some embodiments, the thumbnail generation module 330 generates the page thumbnails on an on-demand basis, where page thumbnails are generated in response to receipt of a navigation command. Note, in general changes in parsing of the ebook made by the parsing module 310 may cause the thumbnail generation module 330 to re-generate one or more page thumbnails.

In some embodiments, the thumbnail generation module 330 identifies all of the ebook pages for generation of associated page thumbnails. In alternate embodiments, some, but not all of the ebook pages are identified for the generation of associated page thumbnails. For example, the thumbnail generation module 330 may identify only a portion of ebook pages within each segment for the generation of associated page thumbnails (e.g., a fixed number of pages before and/or after the ebook page being displayed, every other page, ebook pages including subsection headings, etc.).

The thumbnail generation module 330 then generates page thumbnails for the identified ebook pages by creating a page thumbnail for each of the identified ebook pages and/or retrieving previously created page thumbnails that correspond to the identified ebook pages from the media database 130. In some embodiments, the thumbnail generation module 330 generates a page thumbnail for an ebook page, by creating a smaller version of the ebook page (e.g., by scaling down the size of the image), and the smaller version of the ebook page is used as the page thumbnail associated with the ebook page. For example, a page thumbnail may be a 40% smaller version of the ebook page. Additionally, in some embodiments, the thumbnail generation module 330 retrieves annotation information from the media database 130, and annotates the generated page thumbnail such that some or all of the annotations associated with an ebook page are visible on the page thumbnail.

The grouping module 340 groups the generated page thumbnails by segment. The grouping module 340 identifies one or more segments within the ebook that are associated with the generated page thumbnails. The grouping module 340 may identify segments that are associated with the generated page thumbnails using the segment IDs for the ebook pages that are associated with the page thumbnails. The grouping module 340 then groups the generated page thumbnails by identified segment. For example, if the segment is Chapter 1 of an ebook, the grouping module 340 would group any page thumbnails associated with the ebook pages in Chapter 1 with the segment. The grouping module 340 groups the page thumbnails that are associated with a segment in the same order as their corresponding ebook pages. For example, if the generated page thumbnails correspond to ebook pages 3 and 6, respectively, in Chapter 1 of the ebook, the page thumbnail associated with ebook page 3 would be placed before the page thumbnail associated with ebook page 6.

The navigation interface module 350 generates a navigation interface in the requested navigation mode using the grouped page thumbnails. The navigation interface lists at least one identified segment and the grouped page thumbnails associated with each identified segment. For example, in an intermediate navigation mode the navigation interface presents a segment and one or more page thumbnails associated with that segment, as shown in, e.g., FIG. 2B.

In a TOC mode the navigation interface lists multiple segments and page thumbnails associated with each of the segments. In some embodiments, the navigation interface module 350 lists the identified segments vertically and lists horizontally page thumbnails that are part of the group associated with that segment. Examples of a navigation interface in TOC mode is discussed above with reference to FIG. 2C.

In some embodiments, the navigation interface module 350 may scale the size of the displayed page thumbnails based on, e.g., the type of navigation mode requested. For example, page thumbnails displayed by a navigation interface in intermediate navigation mode may be significantly larger than page thumbnails displayed in the TOC mode.

In some embodiments, the navigation interface module 350 emphasizes the page thumbnail associated with the ebook page that was being presented by the user device 100 when the navigation command was received. The view generation module 350 may emphasize a page thumbnail by, e.g., making the page thumbnail slightly larger than other page thumbnails, highlighting the page thumbnail, bolding a border of the page thumbnail, otherwise distinguish the page thumbnail from other page thumbnails, or some combination thereof. The emphasized page thumbnail may help a user maintain their reading location in the ebook while they navigate elsewhere in the ebook using one or more modes of the navigation GUI.

The navigation interface module 350 presents the generated navigation interface to the user. The generated navigation interface may be responsive to commands received from a user via the user device 100. For example, a navigation interface in an intermediate navigation mode allows the user to page forward/backward through an ebook based on, e.g., a swiping gesture and/or use of a smart scrubber. Additionally, a user is able to easily change the mode of the navigation interface to a TOC mode using, e.g., a pinching gesture and/or selection of a TOC thumbnail. A navigation interface in TOC mode allows the user to scroll (e.g., vertically) through various segments and/or scroll (e.g., horizontally) through various page thumbnails associated with a particular segment. In some embodiments, the navigation interface scrolls the segments and/or various page thumbnails based on receipt of a swiping gesture. As the page thumbnails are smaller versions of the actual ebook page (in both the intermediate navigation mode and the TOC mode), a user is able to easily discern the content of an ebook page using an associated page thumbnail, and navigate to the ebook page simply by selecting (e.g., tapping on the page thumbnail) the page thumbnail. Additionally, as discussed above with reference to FIGS. 2A and 2B, pinching gestures may be used to dynamically scale the size of displayed page thumbnails in the intermediate navigation mode.

Figure 4:
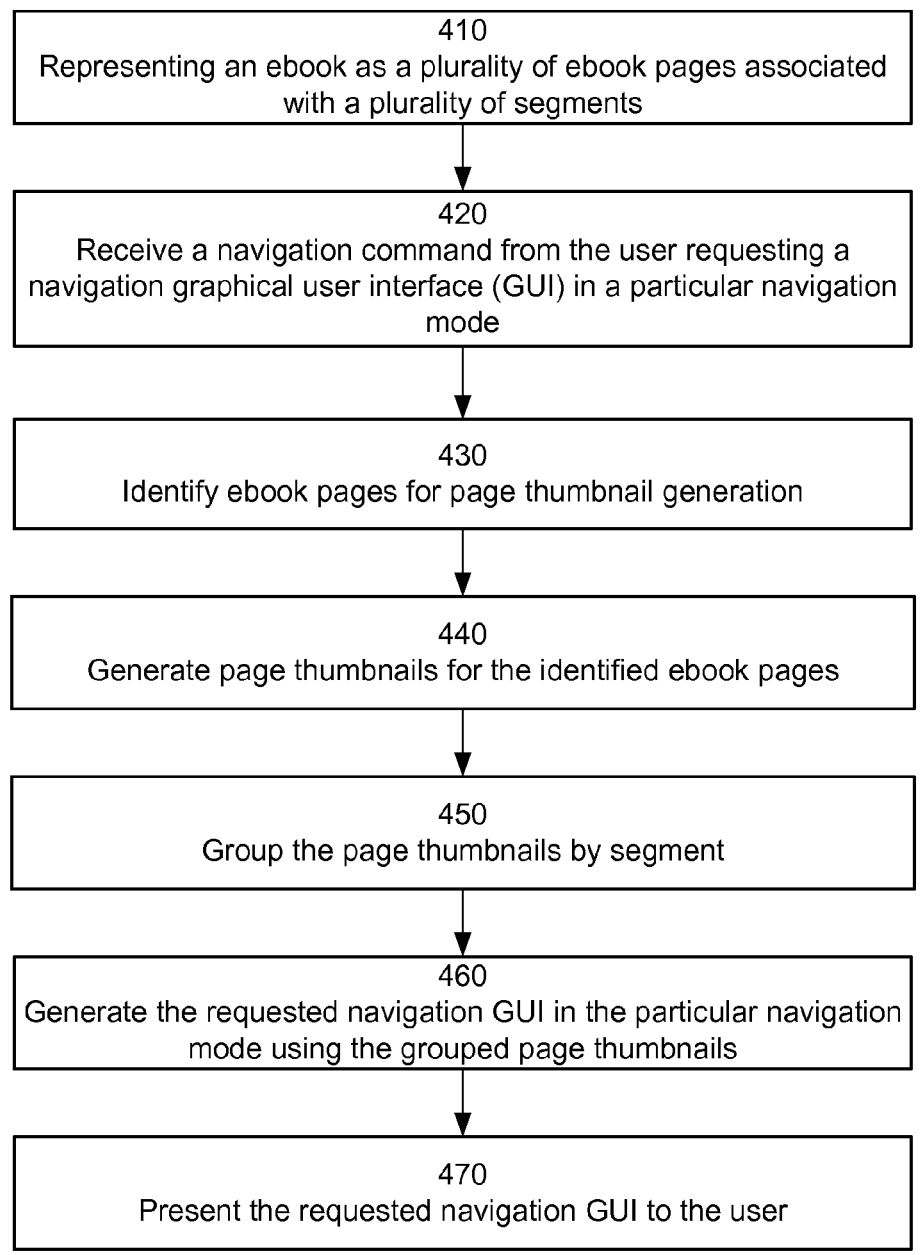
FIG. 4 is a flowchart illustrating a process of generating a navigation interfaces that facilitate navigation of ebooks according to one embodiment.

FIG. 4 is a flowchart illustrating a process of generating navigation interfaces that facilitate navigation of ebooks according to one embodiment. In one embodiment, the process of FIG. 4 is performed by the user device 100. Other entities may perform some or all of the steps of the process in other embodiments. Likewise, embodiments may include different and/or additional steps, or perform the steps in different orders.

The user device 100 represents 410 an ebook as a plurality of ebook pages associated with a plurality of segments. The user device 100 parses the ebook into ebook pages for presentation to the user. The user device 100 presents a portion of the ebook to the user including one or more ebook pages.

The user device 100 receives 420 a navigation command requesting a navigation interface in a particular navigation mode. The navigation command may be received from the user via, for example, a gesture, selection of a soft button, a menu selection, selection of a button on the user device 100, etc. For example, a pinching gesture may be used to select either an intermediate navigation mode or a TOC mode. The user device 100 determines which mode is requested by, e.g., comparing an active distance value against threshold values, such that if the active distance becomes less than a first threshold value an intermediate navigation mode is requested, and if the active distance becomes less than a second threshold value that is smaller than the first threshold value, a TOC mode is requested.

The user device 100 identifies 430 ebook pages for page thumbnail generation. In some embodiments, the user device 100 may identify all the ebook pages for page thumbnail generation. In alternate embodiments, the user device 100 may identify ebook pages for page thumbnail generation that are within a scrolling distance value from being presented by the user device 100.

The user device 100 generates 440 page thumbnails for the identified ebook pages. In some embodiments, user device 100 creates and/or retrieves page thumbnails (e.g., from the media database 130 and/or the media source 120) for the identified ebook pages. Additionally, in some embodiments, the user device 100 retrieves annotation information from the media database 130 for one or more identified ebook pages, and annotates the identified ebook pages prior to generating page thumbnails such that some or all of the annotations associated with the ebook pages are visible on the page thumbnails. In other embodiments, the user device 100 annotates the generated page thumbnails.

The user device 100 groups 450 the page thumbnails by segment. The user device 100 identifies one or more segments within the ebook that are associated with the generated page thumbnails using, e.g., the segment IDs for the ebook pages associated with the page thumbnails. The user device 100 then groups the generated page thumbnails by identified segment.

The user device 100 generates 460 the requested navigation GUI in the particular navigation mode using the grouped page thumbnails. The user device 100 may, e.g., generate a navigation GUI in an intermediate navigation mode or a TOC mode. The generated navigation GUI lists at least one identified segment, and horizontally lists at least one page thumbnail associated with the at least one segment. The user device 100 presents 470 the requested navigation GUI in the particular navigation mode to the user.

Figure 5:
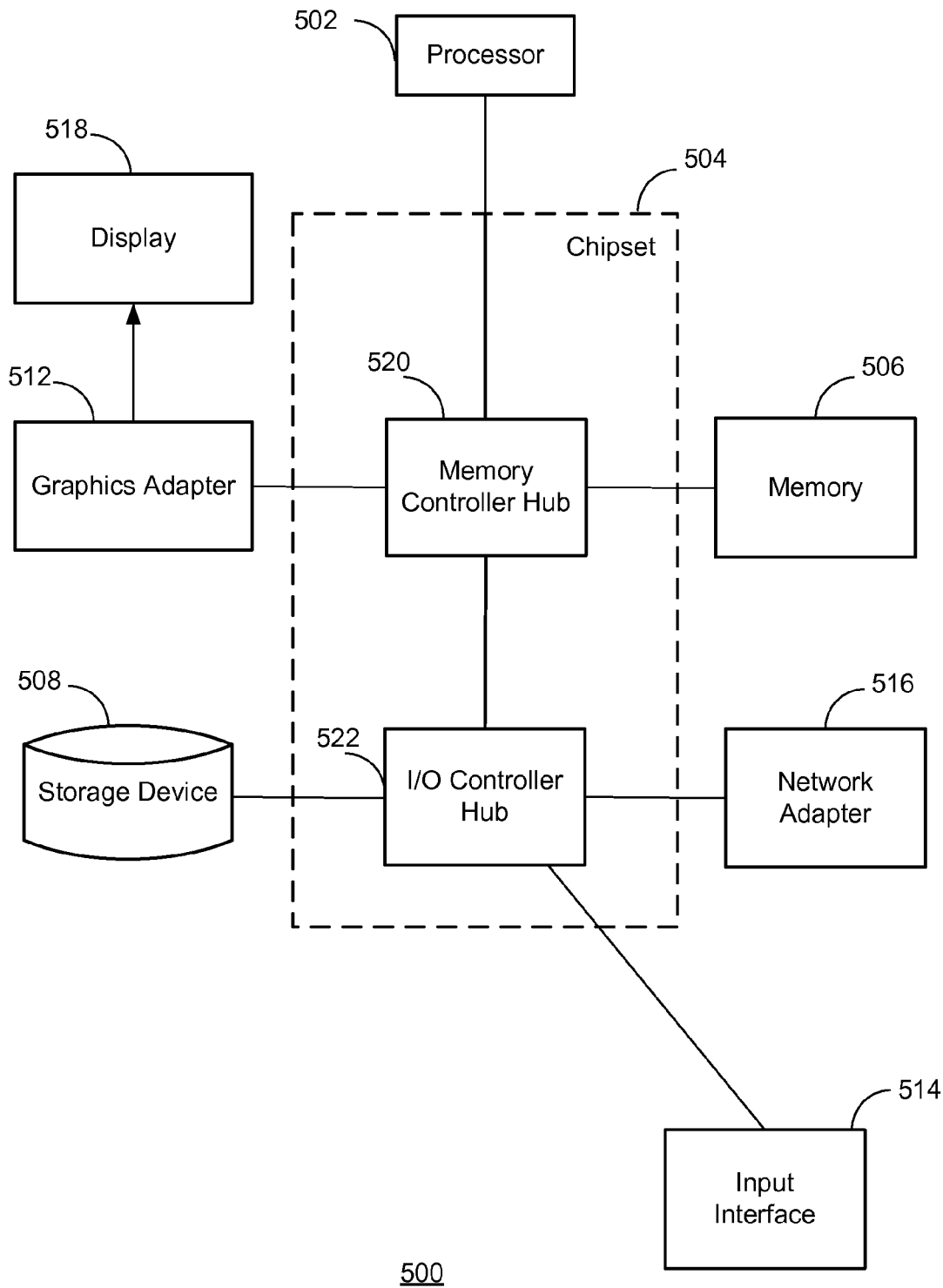
FIG. 5 is a high-level block diagram illustrating an example computer for implementing the entities shown in FIG. 1.

Turning now to a discussion of the implementation of the generation and presentation of navigation GUIs for navigation of media items discussed above, FIG. 5 is a high-level block diagram illustrating an example computer 500 for implementing the entities shown in FIG. 1. The computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, an input interface 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The input interface 514 is a touch-screen interface, a mouse, track ball, or other type of pointing device, a keyboard, or some combination thereof, and is used to input data into the computer 500. In some embodiments, the computer 500 may be configured to receive input (e.g., commands) from the input interface 514 via gestures from the user. The computers 500 monitors gestures made by the user and converts them into commands (e.g., scroll horizontally, scroll vertically, navigation command, selection of a page thumbnail, etc.) The graphics adapter 512 displays images and other information on the display 518. The network adapter 516 couples the computer 500 to one or more computer networks.

The computer 500 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 508, loaded into the memory 506, and executed by the processor 502.

The types of computers 500 used by the entities of FIG. 1 can vary depending upon the embodiment and the processing power required by the entity. For example, the user device 500 may interact with one or more servers working together to provide the functionality described herein. The computers 500 can lack some of the components described above, such as keyboards, graphics adapters 512, and displays 518.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating graphical user interfaces for navigation interfaces that facilitate navigation of ebooks. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for generating navigation interfaces that facilitate navigation of ebooks, comprising:
    representing an ebook as a plurality of ebook pages associated with a plurality of segments;
    displaying a page, of the plurality of ebook pages;
    receiving a navigation command from a user, the navigation command requesting a particular mode of a navigation graphical user interface (GUI) of a predefined set of modes including an intermediate navigation mode and a table of contents (TOC) mode;
    identifying one or more ebook pages, of the plurality of ebook pages, for page thumbnail generation;
    generating page thumbnails for each of the identified one or more ebook pages, wherein a page thumbnail is associated with a same segment as an associated ebook page, and wherein a size of the thumbnail is determined responsive to the requested mode of navigation;
    responsive to the intermediate navigation mode being requested:
    grouping the generated page thumbnails by segment, using the plurality of segments,
    generating the navigation GUI in the intermediate navigation mode using the grouped page thumbnails, the navigation GUI listing at least one segment, of the plurality of segments, and horizontally listing at least one page thumbnail associated with the at least one segment, and
    displaying the navigation GUI in the intermediate navigation mode, wherein the displayed navigation mode replaces the page being displayed with a single thumbnail and at least one partial thumbnail that is adjacent to the single thumbnail, wherein the single thumbnail is a scaled reproduction of the page and the at least one partial thumbnail is a scaled reproduction of a portion of a page adjacent to the page, and wherein the at least one partial thumbnail is smaller than the single thumbnail and sizes of the single thumbnail and at least one partial thumbnail are based in part on the requested navigation mode; and responsive to determining that the navigation command is a pinching gesture requesting the TOC mode:

generating the navigation GUI in the TOC mode, the navigation GUI vertically listing a portion of the plurality of segments, and horizontally listing page thumbnails associated with the listed segments; and displaying the navigation GUI in the TOC, wherein the displayed navigation GUI includes a plurality of thumbnails, wherein sizes of plurality of thumbnails are based on the TOC mode.

2. The method of claim 1, wherein responsive to the TOC mode being requested, further comprises:

identifying one or more segments within the ebook that are associated with the generated page thumbnails; and grouping the generated page thumbnails by identified segment, such that each of the one or more identified segments are associated with at least one generated page thumbnail.

3. The method of claim 1, wherein the navigation GUI in the intermediate navigation mode horizontally lists the single thumbnail and the partial thumbnail.

4. The method of claim 1, further comprising:

determining a reference distance value associated with an original distance between two locations on a touchscreen interface of the user device associated with an initiation of the pinching gesture;

monitoring an active distance value associated with a shrinking distance between the two touched locations of the pinching gesture; and responsive to the active distance value being less than a first percentage of the reference distance, determining that the particular navigation mode is the intermediate navigation mode.

5. The method of claim 4, further comprising:

responsive to the active distance being less than a second percentage of the reference distance and the second percentage is smaller than the first percentage, determining that the particular navigation mode is the TOC mode.

6. The method of claim 1, further comprising:

identifying the single thumbnail associated with the ebook page being presented by the user device when the navigation command was received; and emphasizing the identified single thumbnail.

7. The method of claim 1, wherein the at least one partial thumbnail is a displayed portion of a thumbnail of the scaled reproduction of the page adjacent to the page corresponding to the single thumbnail.

8. The method of claim 1, wherein a size of a thumbnail displayed in the navigation GUI in the intermediate navigation mode is larger than a size of a thumbnail displayed in the navigation GUI in the TOC mode.

9. A non-transitory computer-readable storage medium storing executable computer program instructions for generating navigation interfaces that facilitate navigation of ebooks, the instructions executable by one or more processors of a computing device to:

represent an ebook as a plurality of ebook pages associated with a plurality of segments;

display a page, of the plurality of ebook pages;

receive a navigation command from a user, the navigation command requesting a particular mode of a navigation graphical user interface (GUI) of a predefined set of modes including an intermediate navigation mode and a table of contents (TOC) mode;

identify one or more ebook pages, of the plurality of ebook pages, for page thumbnail generation;

generate page thumbnails for each of the identified one or more ebook pages, wherein a page thumbnail is associated with a same segment as an associated ebook page, and wherein a size of the thumbnail is determined responsive to the requested mode of navigation;

responsive to the intermediate navigation mode being requested:

group the generated page thumbnails by segment, using the plurality of segments, generate the navigation GUI in the intermediate navigation mode using the grouped page thumbnails, the navigation GUI listing at least one segment, of the plurality of segments, and horizontally listing at least one page thumbnail associated with the at least one segment, and display the navigation GUI in the intermediate navigation mode, wherein the displayed navigation mode replaces the page being displayed with a single thumbnail and at least one partial thumbnail that is adjacent to the single thumbnail, wherein the single thumbnail is a scaled reproduction of the page and the at least one partial thumbnail is a scaled reproduction of a portion of a page adjacent to the page, and wherein the at least one partial thumbnail is smaller than the single thumbnail and sizes of the single thumbnail and at least one partial thumbnail are based in part on the requested navigation mode; and responsive to determining that the navigation command is a pinching gesture requesting the TOC mode:

generate the navigation GUI in the TOC mode, the navigation GUI vertically listing a portion of the plurality of segments, and horizontally listing page thumbnails associated with the listed segments; and display the navigation GUI in the TOC mode, wherein the displayed navigation mode includes a plurality of thumbnails, wherein sizes of plurality of thumbnails are based on the TOC mode, and wherein the navigation GUI vertically lists the identified one or more segments, and horizontally lists page thumbnails associated with the listed segments.

10. The computer-readable medium of claim 9, wherein the instructions are further executable by the one or more processors to:

responsive to the TOC mode being requested:

identify one or more segments within the ebook that are associated with the generated page thumbnails; and group the generated page thumbnails by identified segment, such that each of the one or more identified segments are associated with at least one generated page thumbnail.

11. The computer-readable medium of claim 9, wherein the navigation GUI in the intermediate navigation mode horizontally lists the single thumbnail and the partial thumbnail.

12. The computer-readable medium of claim 9, wherein the instructions are further executable by the one or more processors to:

determine a reference distance value associated with an original distance between two locations on a touchscreen interface of the user device associated with an initiation of the pinching gesture;

monitor an active distance value associated with a shrinking distance between the two touched locations of the pinching gesture; and responsive to the active distance value being less than a first percentage of the reference distance, determine that the particular navigation mode is the intermediate navigation mode.

13. The computer-readable medium of claim 12, wherein the instructions are further executable by the one or more processors to:

responsive to the active distance being less than a second percentage of the reference distance and the second percentage is smaller than the first percentage, determine that the particular navigation mode is the TOC mode.

14. The computer-readable medium of claim 9, wherein the instructions are further executable by the one or more processors to:

identify the single thumbnail associated with the ebook page being presented by the user device when the navigation command was received; and emphasize the identified single thumbnail.

15. A device for generating navigation interfaces that facilitate navigation of ebooks, comprising:

a processor configured to execute modules; and a memory storing the modules, the modules executable by the processor to:

represent an ebook as a plurality of ebook pages associated with a plurality of segments;

display a page, of the plurality of ebook pages;

receive a navigation command from a user, the navigation command requesting a particular mode of a navigation graphical user interface (GUI) of a predefined set of modes including an intermediate navigation mode and a table of contents (TOC) mode;

identify one or more ebook pages, of the plurality of ebook pages, for page thumbnail generation;

generate page thumbnails for each of the identified one or more ebook pages, wherein a page thumbnail is associated with a same segment as an associated ebook page, and wherein a size of the thumbnail is determined responsive to the requested mode of navigation;

responsive to the intermediate navigation mode being requested:

group the generated page thumbnails by segment, using the plurality of segments, generate the navigation GUI in the intermediate navigation mode using the grouped page thumbnails, the navigation GUI listing at least one segment, of the plurality of segments, and horizontally listing at least one page thumbnail associated with the at least one segment, and display the navigation GUI in the intermediate navigation mode, wherein the displayed navigation mode replaces the page being displayed with a single thumbnail and at least one partial thumbnail that is adjacent to the single thumbnail, wherein the single thumbnail is a scaled reproduction of the page and the at least one partial thumbnail is a scaled reproduction of a portion of a page adjacent to the page, and wherein the at least one partial thumbnail is smaller than the single thumbnail and sizes of the single thumbnail and at least one partial thumbnail are based in part on the requested navigation mode; and responsive to determining that the navigation command is a pinching gesture requesting the TOC mode:

generate the navigation GUI in the TOC mode, the navigation GUI vertically listing a portion of the plurality of segments, and horizontally listing page thumbnails associated with the listed segments; and display the navigation GUI in the TOC, wherein the displayed navigation GUI includes a plurality of thumbnails, wherein sizes of plurality of thumbnails are based on the TOC mode.

16. The device of claim 15, wherein the modules are further executable by the processor to:

identify one or more segments within the ebook that are associated with the generated page thumbnails; and group the generated page thumbnails by identified segment, such that each of the one or more identified segments are associated with at least one generated page thumbnail.

17. The device of claim 15, wherein the navigation GUI in the intermediate navigation mode horizontally lists the single thumbnail and the partial thumbnail.

18. The device of claim 15, wherein the modules are further executable by the processor to:

determine a reference distance value associated with an original distance between two locations on a touchscreen interface of the user device associated with an initiation of the pinching gesture;

monitor an active distance value associated with a shrinking distance between the two touched locations of the pinching gesture; and responsive to the active distance value being less than a first percentage of the reference distance, determine that the particular navigation mode is the intermediate navigation mode.

19. The device of claim 18, wherein the modules are further executable by the processor to:

responsive to the active distance being less than a second percentage of the reference distance and the second percentage is smaller than the first percentage, determine that the particular navigation mode is the TOC mode.

* * * * *